Aug. 20, 1968   M. D. GILL ET AL   3,397,929
REMOVABLE BEARINGS
Filed June 22, 1964
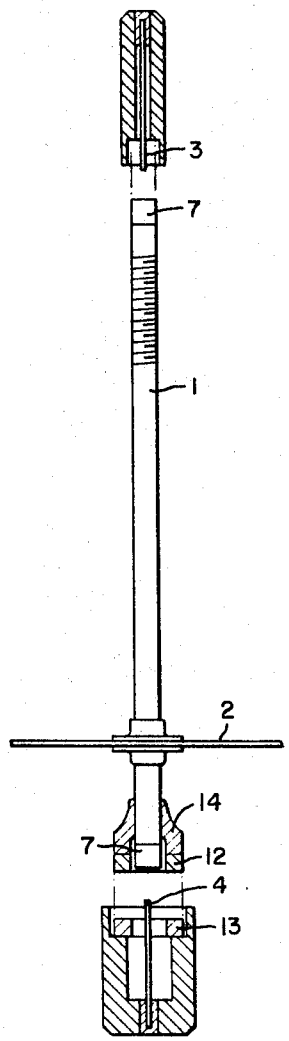
Fig. 1.
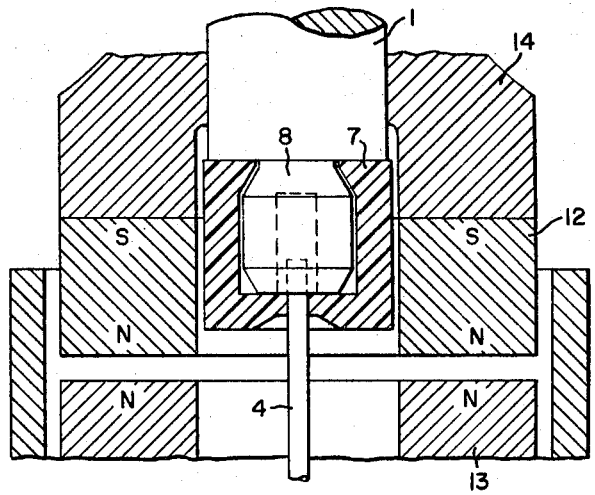
Fig. 2.
Fig. 3.
WITNESSES:
John L. Chopp
James F. Young
INVENTORS
Merrion D. Gill and
Eugene G. Bezgela
BY C. L. Freedman
ATTORNEY

United States Patent Office 3,397,929
Patented Aug. 20, 1968

3,397,929
REMOVABLE BEARINGS
Merrion D. Gill and Eugene G. Bezgela, Raleigh, N.C.,
assignors to Westinghouse Electric Corporation, Pittsburgh, Pa., a corporation of Pennsylvania
Filed June 22, 1964, Ser. No. 376,940
9 Claims. (Cl. 308—10)

ABSTRACT OF THE DISCLOSURE

A bearing assembly includes a stator unit and a rotor unit mounted for relative rotation. The mounting includes a cylindrical member or pin on one unit which is journaled within a plastic such as a crystallized acetal resin available under the trade name "Delrin." The plastic is in the form of a cup which is snapped over a bulbous projection on the other unit.

---

This invention relates to rotatable structures and has particular relation to an improved form of bearing.

It has heretofore been proposed that a rotor be supported for rotation about a vertical axis. In a preferred bearing system, the rotor is supported by the repulsive force between two magnets which counteract the pull of gravity, and a supplemental annular or ring bearing which counteracts any horizontal radial components of force which might become active.

In accordance with the present invention, a vertical cylindrical pin or shaft, usually of steel or other suitable metal, guiding a rotor such as that of an electric watthour meter for rotation about a vertical axis, is journaled within a member of plastic material having a low coefficient of friction and desirably having substantial elasticity. For illustrative purposes, the material may be selected from the group consisting of polycarbonate, nylon, fluorocarbon (e.g. polytetrafluoroethylene), or an acetal resin having a low coefficient of friction against the said shaft. A plastic which we have found particularly desirable for use with a steel pin or shaft is crystallized acetal resin, a crystalline, stable, polymerized formaldehyde sold under the trade name "Delrin" by the Polychemicals Department, E. I. du Pont de Nemours & Co. (Inc.), Wilmington, Delaware.

For some fields of use bearings which can operate without lubrication, attention, or care for a billion and a half revolutions are in demand, and to devise a bearing capable of meeting such extreme demands has proven in practice to be a matter of very great difficulty.

It is therefore an object of the invention to provide an improved mounting for a rotor unit which is designed for rotation about a vertical axis.

It is also an object of the invention to provide an annular bearing for a rotor unit.

It is another object of the invention to provide a bearing for mounting on a stator a rotor unit, said rotor and stator having means for exerting an axial force on the rotor, said bearing comprising an annular surface concentric with said axis, such bearing being capable of operating for extremely long periods without attention.

It is an additional object of the invention to provide an improved removable bearing for rotors mounted for rotation about a vertical axis.

It is a further object of the invention to provide a bearing combining, with a stator and a rotor respectively provided with magnets exerting force along a shaft projecting from said rotor, an annular bearing-surface surrounding said shaft engaging a cylindrical projection from said stator, and said annular bearing-surface having a low friction coefficient against said projection.

Other objects of the invention will be apparent from the following description taken in conjunction with the accompanying drawings, in which:

FIGURE 1 is a view in front elevation partially exploded and with parts broken away, of a bearing embodying the invention;

FIG. 2 is a view in sectional elevation with parts broken away and to expanded scale showing the upper bearing of FIG. 1; and FIG. 3 is a similar view of the lower bearing of FIG. 1.

Referring to the drawings, reference numeral 1 is the shaft of a rotor, which may for purposes of illustration be shown as the shaft of a watthour meter, carrying a rotor 2 of the disk type having at its upper end a bearing which is shown in expanded form and partly in section in FIG. 2, and at its lower end a second bearing which is shown similarly expanded and partially in section in FIG. 3.

This rotor is radially guided by a single projection 3 at the upper bearing, and by a similar projection 4 from the stator at the lower bearing, the projections constituting parts of a stator. Since the portions of the stator other than those shown in FIGS. 2 and 3 are not important parts of the present invention, they are not shown in more detail in the drawings. The projections 3 and 4 of the stator may for many purposes including the present be of stainless steel and of a length large compared with their diameters so that they have considerable elasticity or flexibility.

As shown in more detail in FIG. 2, the steel projection 3 on the stator makes engagement with a cap 7 carried by the upper end of the shaft 1. The cap 7 may be made of a suitable plastic material such as a polycarbonate, an acetal resin, nylon, or a fluorocarbon. It has been found that the crystallized acetal resin sold under the trade name of "Delrin" by the Polychemicals Department of E. I. du Pont de Nemours & Co. (Inc.), Wilmington, Del., is excellently suited to the purposes mentioned above. It has been found that this material Delrin, as well as the other materials mentioned, has a very low coefficient of friction with steel such as is used in the projections 3 and 4, has excellent wearing qualities and an extremely long life in service, even without lubrication or other special care during use.

The cap 7 preferably has elasticity or resilience and is held in position by a snap fit over a projection 8 on the upper end of the shaft 1. It has been found that the crystalline acetal resins have sufficient elasticity to make a fit with the projection from the aluminum shaft 1 if the maximum diameter of this projection is slightly greater than the opening in the lower surface of the cap 7. The interior of the projection 8 is formed with a cavity 8A sufficiently large in diameter so that its walls never contact those of the projection 3 on the stator.

The lower bearing in FIG. 3 has magnetic components which supply a force capable of supporting the weight of the rotor without any frictional engagement between surfaces except the annular bearing between the cap 7 of crystalline acetal resin and the projection 4 from the stator. Since the cap 7 is connected to the shaft 1 by snap fit on the projection 8 from the latter and makes similar engagement with the projection 4 as has already been described in connection with FIG. 2, no further description of these parts in FIG. 3 is believed necessary.

The end of the shaft 1 is affixed to an annular magnet 12 having an annular north pole at its lower face and a south pole at its upper face. A similar annular magnet 13 is affixed to the stator. The repulsion between the contiguous north poles N on the rotor magnet 12 and the stator magnet 13 supplies a force across the air gap between them which is just sufficient to uphold the weight of the rotor, the air gap adjusting itself automatically to supply this force. The magnet 12 is supported from the shaft 1 by a member 14. The annular bearing between the cap 7 and the projection 4 from the stator maintains vertical alignment between the shaft 1 and the projection 4.

In ways that are believed to be obvious to those skilled in the art the cap 7 may be affixed to the end of the shaft 1 by staking in place, or by spinning a rim of the end of the aluminum shaft around the cap 7 near their junction. The crystalline acetal resin described as the material for the cap 7 is readily machined or even molded into the shape and dimensions desired. However, it is preferred to make the cap 7 a snap fit on the projection 8. It will be noted that the projection 8 at the upper end of the shaft 1 has a bevel 8B at its upper end and a bevel 8C at its lower end.

The upper bevel 8B assists in guiding the cap over the projection 8 when the cap is applied to the projection. The lower bevel 8C coacts with a mating bevel on the cap to retain the cap on the projection. The material employed has adequate resilience to permit a cap to be snapped over the projection and to hold the cap securely in place with a cylindrical wall 7A on the interior of the cap snugly engaging an exterior cylindrical wall 8D of the projection 8. This fit maintains the cap accurately concentric with the projection.

We claim as our invention:

1. A bearing comprising a cylindrical projection symmetrical with its axis of rotation, a member rotatable about the axis of said projection having a surface concentric with the cylindrical surface of said projection and composed of an acetal resin wherein said rotatable member comprises a metal shaft having a neck portion defining an end portion projecting into a cup formed in the axis of a cylindrical end cap of an acetal resin, the open end of said end cap having a flange located in said neck portion.

2. The arrangement described in claim 1 wherein said end portion of said metal shaft is dimensioned to form a snap fit in said cup.

3. In an assembly comprising a stator, a rotor, an elongated resilient cylindrical guide pin having an end supported in said stator, a shaft fixed to said rotor concentric with its axis of rotation, and having an end portion of reduced diameter projecting into a cup formed in the axis of a cylindrical end cap of an acetal resin.

4. The arrangement described in claim 3 wherein means are provided to exert a force tending to move said rotor in a direction parallel to said axis.

5. In an assembly comprising a stator and rotor, an elongated resilient cylindrical guide pin having one end supported in said stator, a shaft fixed to said rotor concentric with its axis of operation, and having an end portion of reduced diameter projecting into a cup formed in the axis of a cylindrical end cap of an acetal resin, wherein said end portion of said shaft is dimensioned to form a snap fit in said cap, and means to exert a force tending to move said rotor in a direction parallel to said axis.

6. In an assembly comprising a stator and rotor, an elongated resilient cylindrical guide pin having an end supported in said stator, a shaft fixed to said rotor concentric with its axis of rotation and having an end portion of reduced diameter projecting into a cup formed in the axis of a cylindrical end cap composed of an acetal resin, an annular magnet fixed to said stator with its axis coinciding with said axis of rotation, and an annular magnet fixed to said rotor having its axis coincident with the axis of said shaft.

7. In an induction device, a stator assembly, a rotor assembly including a shaft unit positioned on a vertical axis, said shaft unit comprising a shaft member having bulbous ends, and a ring bearing for each of said ends, each of said ring bearings comprising a cup-shaped resilient plastic ring bearing member having a snap fit over the associated bulbous end.

8. An assembly comprising a stator unit, a rotor unit, and bearing means mounting the rotor unit for rotation relative to said stator unit about an axis, said bearing means comprising a shaft projection on a first one of said units and concentric with said axis, a tubular shaft extention on a second one of said units concentric with said axis, a cup-shaped plastic cap within which the shaft extension is detachably received, said cap having an end wall substantially abutting the end of said shaft extension and having an opening aligned with the cavity of said tubular shaft extension for receiving the shaft projection, said cap serving as a bearing for the shaft projection.

9. An assembly as claimed in claim 8 wherein said shaft extension has a neck smaller in diameter than a remaining portion of the shaft extension, said cap having an inwardly extending flange adjacent its open end which is detachably received within said neck, said cap having sufficient resilience to permit movement of the flange into and out of said neck as the cap is mounted on and removed from the shaft extension.

References Cited
UNITED STATES PATENTS

| | | | |
|---|---|---|---|
| 2,311,382 | 2/1943 | Hansen | 308—10 |
| 2,953,415 | 9/1960 | Hartmann | 310—90 |

MILTON O. HIRSCHFIELD, *Primary Examiner.*

L. L. SMITH, *Assistant Examiner.*